United States Patent [19]
Yamamoto et al.

[11] Patent Number: 5,963,750
[45] Date of Patent: Oct. 5, 1999

[54] IMAGE SENSING DEVICE

[75] Inventors: Yasuhiro Yamamoto; Tahei Morisawa, both of Tokyo, Japan

[73] Assignee: Asahi Kogaku Kogyo Kabushiki Kaisha, Tokyo, Japan

[21] Appl. No.: 08/816,033

[22] Filed: Mar. 11, 1997

[30] Foreign Application Priority Data

Mar. 15, 1996 [JP] Japan ..................................... 8-087469
Oct. 17, 1996 [JP] Japan ..................................... 8-295761

[51] Int. Cl.⁶ ................................................... G03B 19/00
[52] U.S. Cl. ........................................... 396/429; 396/100
[58] Field of Search ................................ 396/30, 429, 80, 396/100, 111, 116, 273

[56] References Cited

U.S. PATENT DOCUMENTS

| | | | |
|---|---|---|---|
| 4,945,423 | 7/1990 | Takanashi et al. | 358/300 |
| 5,294,990 | 3/1994 | Aoki . | |
| 5,424,156 | 6/1995 | Aoki et al. . | |
| 5,629,920 | 5/1997 | Sakano et al. | 369/120 |
| 5,687,402 | 11/1997 | Kishimoto et al. | 396/80 |
| 5,731,864 | 3/1998 | Hamada et al. | 354/402 |
| 5,797,049 | 8/1998 | Ohtaka et al. | 396/122 |

FOREIGN PATENT DOCUMENTS 5-2280  1/1993  Japan .

*Primary Examiner*—Safet Metjahic
*Assistant Examiner*—John Chizmar
*Attorney, Agent, or Firm*—Greenblum & Bernstein, P.L.C.

[57] ABSTRACT

An image sensing device provided in a camera using an electro-developing recording medium which electronically develops an image formed by a photographing optical system. During descending of the electro-developing recording medium, a light outputted from a light source passes through the electro-developing recording medium, so that an image recorded in the electro-developing recording medium is read by a line sensor. When an image is recorded on the electro-developing recording medium, the line sensor is directed to a sub-mirror provided to a quick return mirror. Thus, a light led from the photographing optical system is detected by the line sensor, so that an auto-focusing condition of the photographing optical system is sensed based on an output signal of the line sensor.

18 Claims, 9 Drawing Sheets

IMAGE SENSING DEVICE

BACKGROUND OF THE INVENTION

1. Field of the Invention

The present invention relates to a camera using a recording medium in which an object image obtained through a photographing optical system is electronically developed, and more particularly, to a device sensing a focusing condition of the photographing optical system.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. In this specification, such a recording medium is referred to as an electro-developing recording material, and an electronic still camera using the electro-developing recording material is referred to as an electro-developing type camera.

In the electro-developing type camera, it is necessary that an object image obtained by the photographing optical system is focused on the recording medium. If an exclusive optical sensor is provided in the camera to perform the focusing operation, the construction of the camera becomes complex and bulky.

SUMMARY OF THE INVENTION

Therefore, an object of the present invention is to provide an image sensing device and an electro-developing type camera by which a state of focus of the image is obtained by a simple and compact construction.

According to the present invention, there is provided an image sensing device provided in an electro-developing type camera in which an image obtained by a photographing optical system is formed on an electro-developing recording medium, by which the image is electronically developed, the device comprising an optical sensor, a sensing unit, and a reading unit.

The sensing unit senses a state of focus of an image formed by the photographing optical system, by the optical sensor. The reading unit reads the image developed by the electro-developing recording medium, by the optical sensor.

Further, according to the present invention, there is provided an electro-developing type camera using an electro-developing recording medium, the electro-developing type camera comprising a photographing optical system and an optical sensor.

An image is formed on the electro-developing recording medium through the photographing optical system. The image is electronically developed by the electro-developing recording medium. The optical sensor senses a focusing condition of the image formed through the photographing optical system. The optical sensor can read the image developed by the electro-developed recording medium.

Furthermore, according to the present invention, there is provided an electro-developing type camera comprising an optical sensor and an electro-developing recording medium by which an image is electronically developed. The optical sensor reads the image from the electro-developing recording medium, and can sense the state of focus of an image formed on the electro-developing recording medium.

Further, according to the present invention, there is provided an electro-developing type camera in which an image electronically developed by an electro-developing recording medium can be read by an optical sensor, the electro-developing type camera comprising a focusing condition sensing processor for sensing a state of focus of the image formed on the electro-developing recording medium, by the optical sensor.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
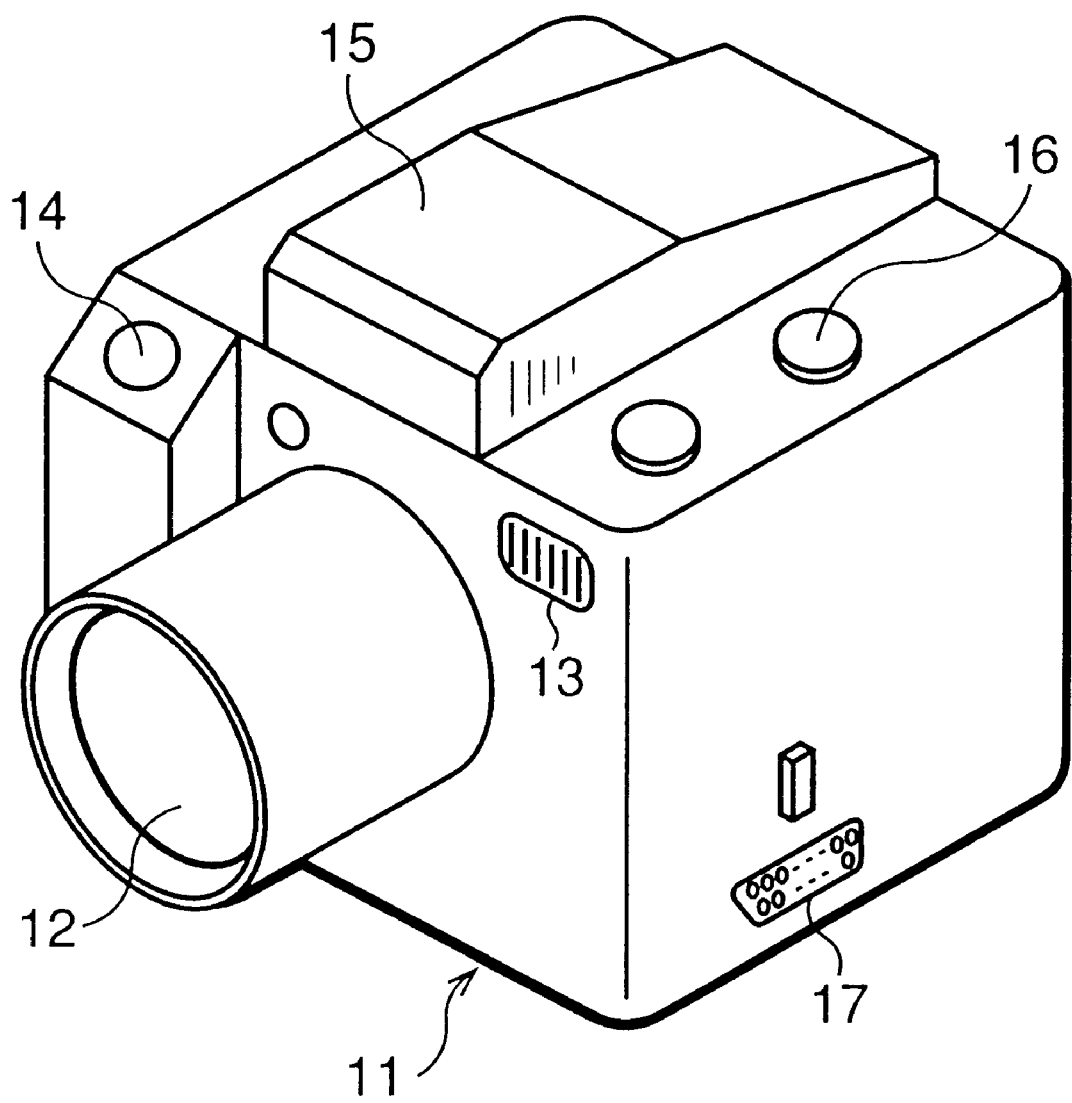
FIG. 1 is an external view showing an electro-developing type camera to which an embodiment according to the present invention is applied.

FIG. 1 is an external view of an electro-developing type camera to which an embodiment according to the present invention is applied. Note that, although the shape of a camera body 11 shown in FIG. 1 is different from those shown in FIGS. 3 and 5, FIG. 1 merely shows the arrangement of each of the outer components provided on the camera body 11, and does not show the actual shape thereof.

When viewing the camera body 11 from a front side, a photographing optical system 12 including a photographing lens system and so on is provided approximately at a center portion of the front surface of the camera body 11, and an electronic flash 13 is disposed thereon to the right of and above the photographing optical system 12. A release button 14 is provided on the side opposite to the electronic flash 13.

On the upper surface of the camera body 11, a view finder 15 is provided at a center portion thereof and is extended from the front end to the rear end of the camera body 11. A scanning switch 16 is provided on the upper surface and beside the view finder 15. An output terminal 17 is formed on a lower portion of a side surface of the camera body 11, so that an image signal obtained by this camera can be outputted to an external recording device.

Figure 2:
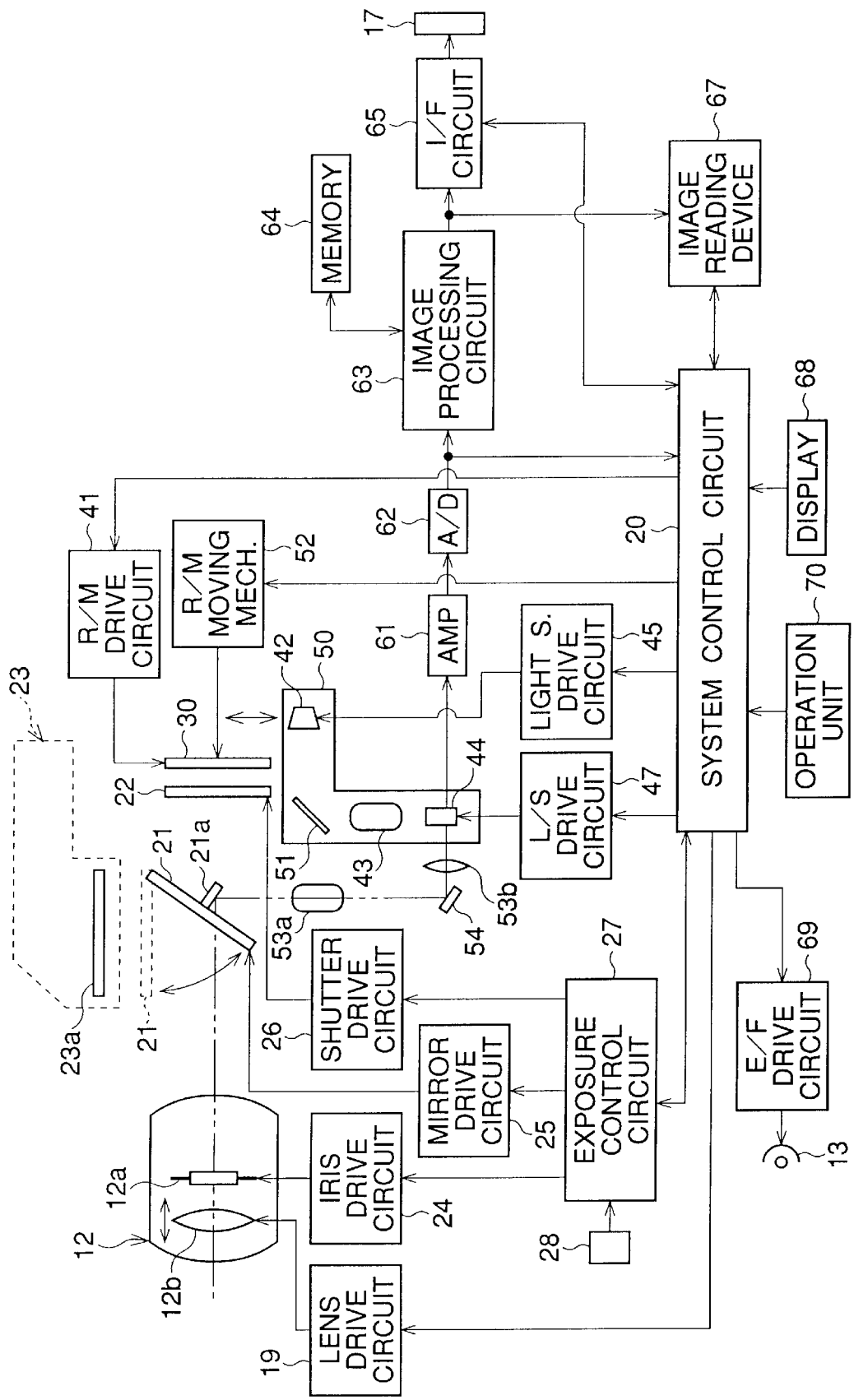
FIG. 2 is a block diagram of the electro-developing type camera.

FIG. 2 is a block diagram of the electro-developing type camera, in which a system control circuit 20 including a microcomputer is mounted to control the electro-developing type camera as a whole.

The photographing optical system 12 has an aperture 12a and a plurality of lens groups 12b. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The lens groups 12b are moved along the optical axis by a lens drive circuit 19, so that the positions thereof are adjusted to perform a focusing operation or a zooming operation. In an auto-focusing operation, the lens drive circuit 19 is controlled based on a control signal outputted by the system control circuit 20, so that a command signal corresponding to the amount of the lens groups 12a to be moved is outputted by the lens drive circuit 19 to the lens groups 12a.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under the control of the exposure control circuit 27 based on a signal outputted by a photometry sensor 28.

The quick return mirror 21 is usually set to a down position (an inclining position shown by the solid line in the drawing), so that a light beam passing through the photographing optical system 12 is led to the view-finder optical system 23, and thus an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, but during a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, to thereby form a two-dimensional image thereon.

An electric voltage (recording medium activating signal) is applied to the electro-developing recording medium 30 under the control of a recording medium drive circuit 41. By exposing the electro-developing recording medium 30 while applying this voltage, an image formed by the photographing optical system 12 is developed on the electro-developing recording medium 30 as a visible image. Note that the recording medium drive circuit 41 is operated in accordance with a command signal outputted by the system control circuit 20.

A support frame 50 is provided close to the electro-developing recording medium 30. A light source 42, a scanner optical system 43, a line sensor (i.e., an optical sensor) 44, and a mirror 51 are supported by the support frame 50.

The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal.

Figure 3:
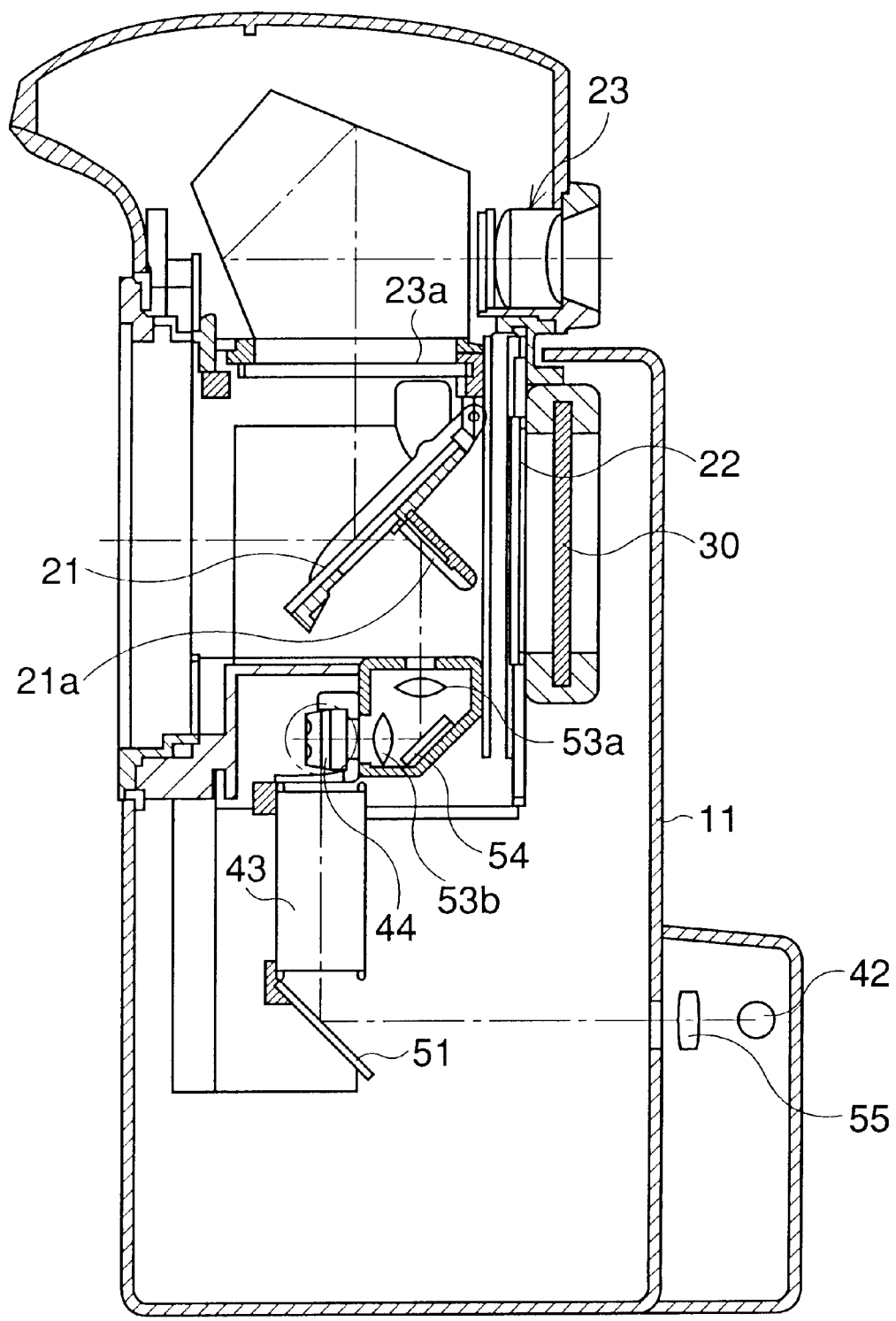
FIG. 3 is a sectional view showing a condition of each member provided in a camera body in a photographing operation.
Figure 5:
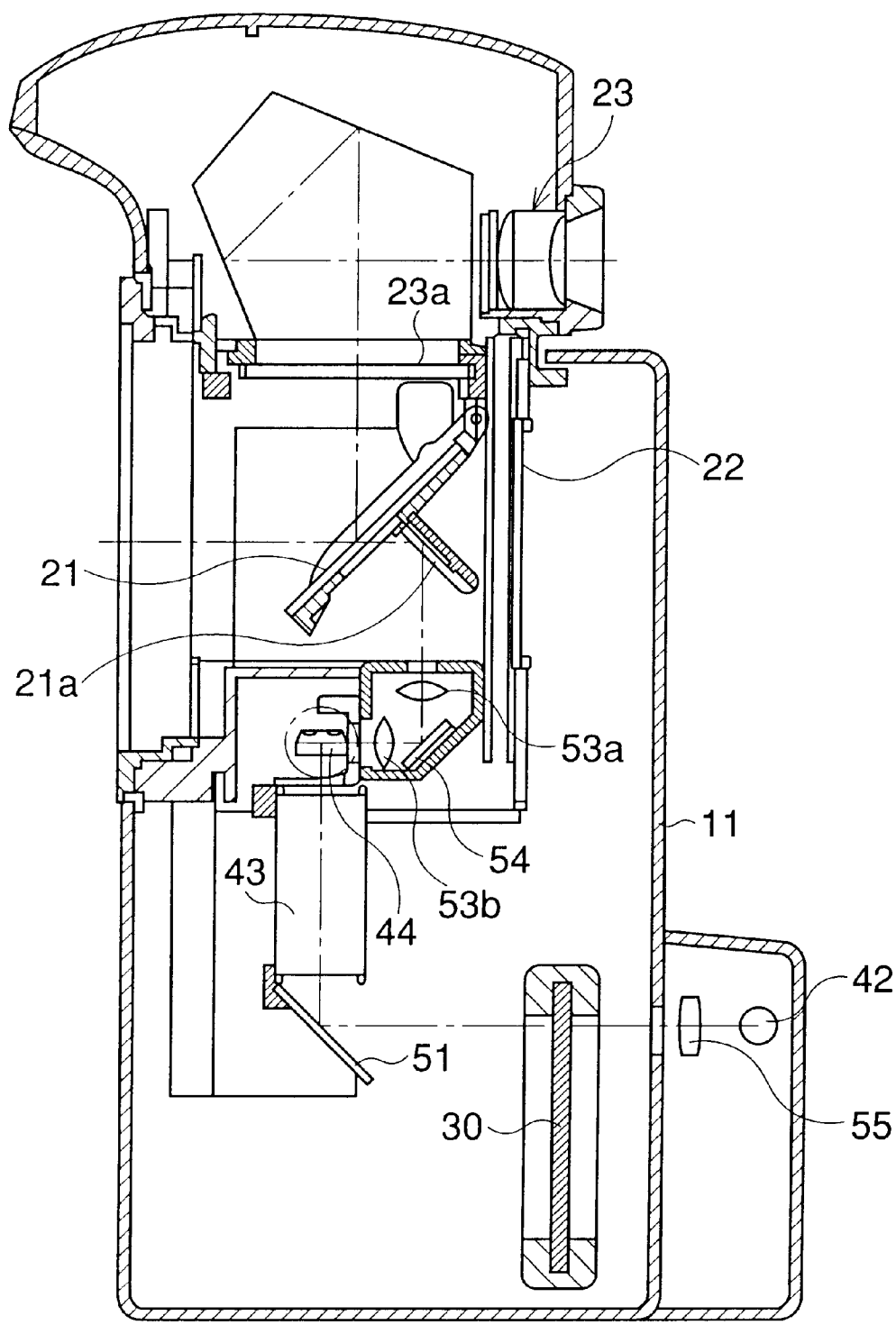
FIG. 5 is a sectional view showing a condition of each member provided in a camera body in a reading operation.

The light source 42 is an LED (i.e., a light emitting diode), for example, and is located on the opposite side of the photographing optical system 12 relative to the electro-developing recording medium 30. The light source 42 illuminates the electro-developing recording medium 30 when an image recorded on the electro-developing recording medium 30 is read. As shown in FIGS. 3 and 5, a collimating lens 55 is provided in front of the light source 42, so that a light beam outputted by the light source 42 is changed to a linear parallel beam. The linear parallel beam has a length covering at least the length of the line sensor 44, and illuminates onto the electro-developing recording medium 30.

The scanner optical system 43, the line sensor 44, and the mirror 51 are placed on one side of the electro-developing recording medium 30 toward the photographing optical system 12. The mirror 51 faces the light source 42, and the scanner optical system 43 is provided between the mirror 51 and the line sensor 44.

The electro-developing recording medium 30 can be moved by a recording medium moving mechanism 52 in a direction perpendicular to the optical axis of the photographing optical system 12, and can move between the light source 42 and the mirror 51. In this movement, an image recorded in the electro-developing recording medium 30 is illuminated by the light source 42 and formed on the light receiving surface of the line sensor 44, through operations of the mirror 51 and the scanner optical system 43.

An ON and OFF control of the light source 42 is performed by a light source drive circuit 45, and the control of the reading operation of the pixel signals generated in the line sensor 44 are carried out by a line sensor drive circuit 47. The light source drive circuit 45, the line sensor drive circuit 47, and the recording medium moving mechanism 52 are controlled by the system control circuit 20.

The pixel signals read out from the line sensor 44 are amplified by an amplifier 61, and converted to a digital signal by an A/D converter 62. The digital pixel signals are subjected to a shading correction, a gamma correction and so on by an image processing circuit 63 under the control of the system control circuit 20, and then temporarily stored in a memory 64. The memory 64 includes an EEPROM in which correction data for the shading correction is stored. Note that the memory 64 has a storage capacity of one frames's worth of pixel signals.

The pixel signals read from the memory 64 are inputted to an interface circuit 65 through the image processing circuit 63, so that the pixel signals are subjected to a predetermined process such as a format conversion, and can be outputted to an external computer (not shown) through the output terminal 17. The pixel signals outputted from the image process circuit 63 can be recorded on a recording medium such as an IC memory card, for example, in an image recording device 67. The interface circuit 65 and the image recording device 67 are operated in accordance with a command signal outputted from the system control circuit 20.

An operation unit 70 that includes the release button 14, the scanning switch 16, and so on is connected to the system control circuit 20. A photographing operation (i.e. a recording operation) and a reading operation of image signals are performed by operating the release button 14 and the scanning switch 16. A display device 68 for indicating various setting conditions of the electro-developing type camera, and an electronic flash drive circuit 69 for performing a flash control of the electronic flash 13 are also connected to the system control circuit 20.

In this embodiment, the line sensor 44 can be used for carrying out an auto-focusing (AF) operation. For the AF operation by the line sensor 44, AF optical systems 53a and 53b and a mirror 54 are provided close to the support frame 50, and a sub-mirror 21a is provided on a rear surface of the quick return mirror 21. The AF optical systems 53a and 53b and the mirror 54 are positioned under the sub-mirror 21a. The line sensor 44 can be rotated about the longitudinal axis thereof. In the auto-focusing operation, the quick return mirror 21 is in the down-position, and the light receiving surface of the line sensor 44 faces the mirror 54. Therefore, a light passing through the photographing optical system 12 is reflected by the sub-mirror 21a, and is condensed by the AF optical systems 53a and 53b, and is led onto the light receiving surface of the line sensor 44 by the mirror 54. Conversely, in the reading operation, the light receiving surface of the line sensor 44 faces the scanner optical system 43, and an image recorded in the electro-developing recording medium 30 is illuminated by the light source 42 so that the image is read by the line sensor 44, as described above.

Figure 4:
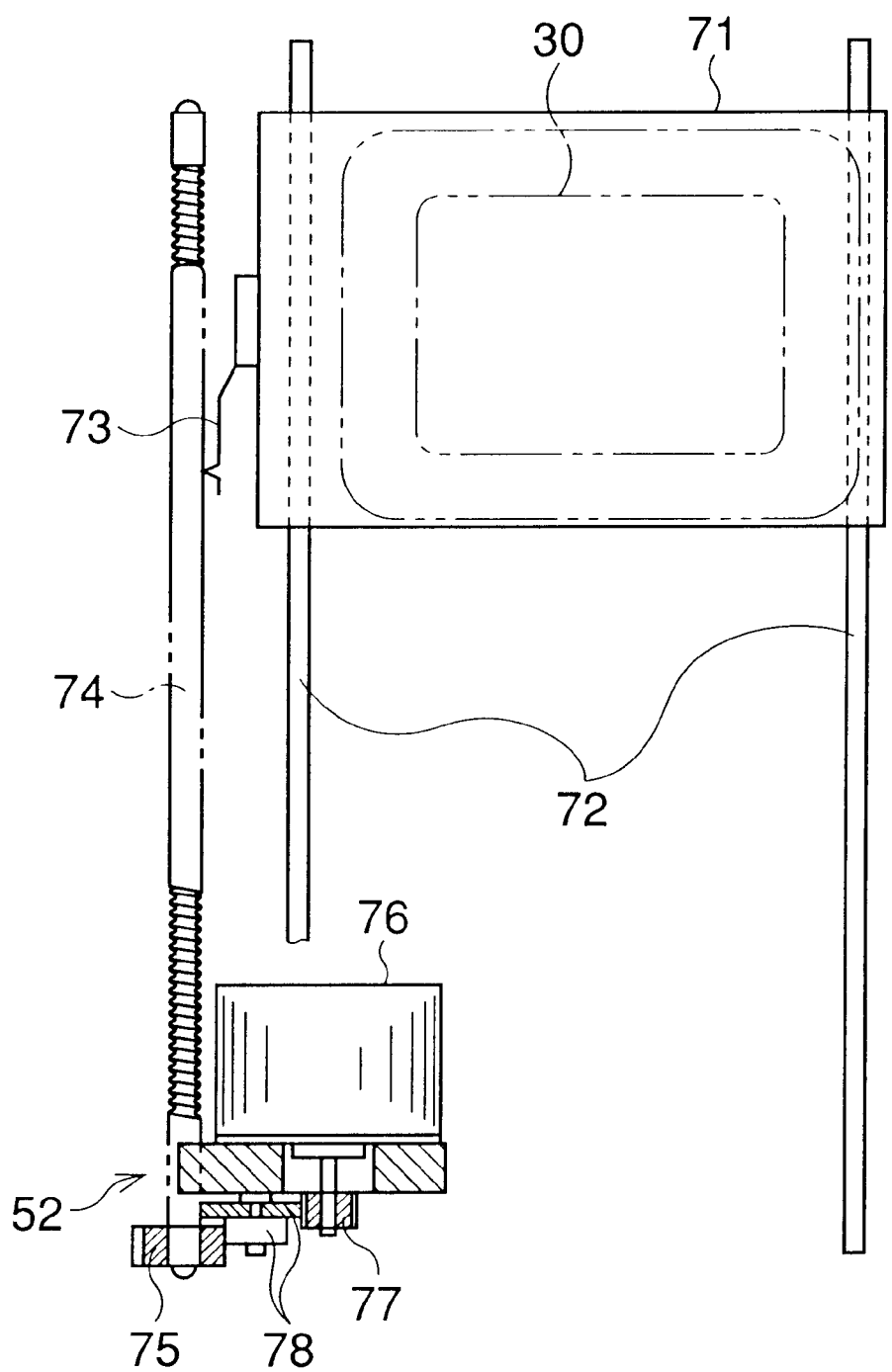
FIG. 4 is a partially sectional view showing an electro-developing recording medium and a recording medium moving mechanism in the photographing operation.
Figure 6:
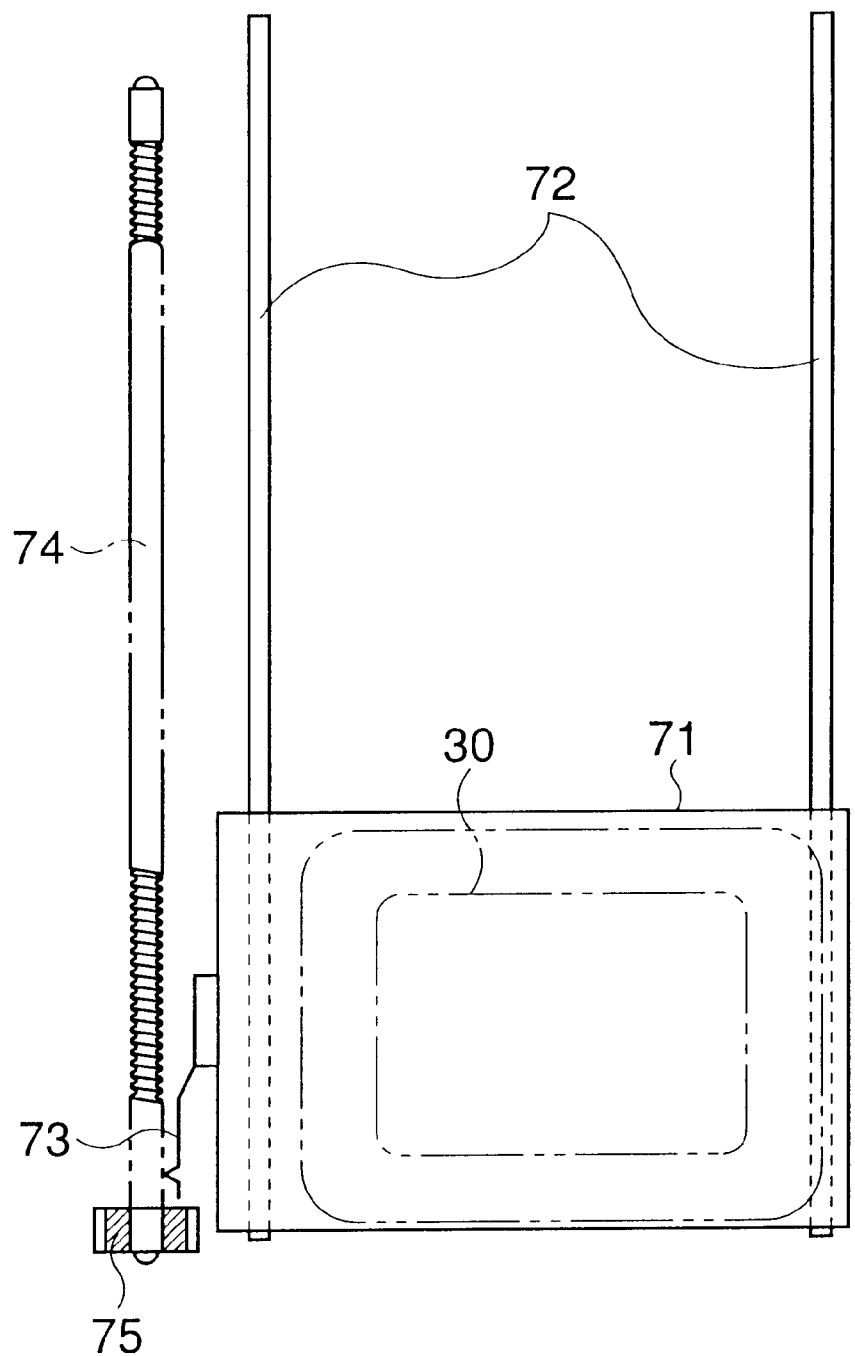
FIG. 6 is a partially sectional view showing an electro-developing recording medium and a recording medium moving mechanism in the reading operation.

FIGS. 3 and 4 show conditions of each of the members in the photographing operation, and FIGS. 5 and 6 show conditions of each of the members in the reading operation. Note that, in FIGS. 3 and 5, the photographing optical system 12 (see FIGS. 1 and 2) is omitted.

The electro-developing recording medium 30 is attached to a carriage 71, which is supported by a pair of support shafts 72 to move upwards and downwards. An engaging member 73 is fixed on a side surface of the carriage 71, and is engaged with a thread formed on the thread shaft 74 which extends parallel to the support shafts 72. A drive gear 75 is provided on the lower end of the thread shaft 74, and a recording medium drive motor 76 is disposed close to the lower end of the thread shaft 74. The drive gear 75 is connected to an output gear 77 fixed on an output shaft of the recording medium drive motor 76, through a reduction gear 78.

Therefore, when the recording medium drive motor 76 is driven, the thread shaft 74 is rotated by the output gear 77, the reduction gear 78, and the drive gear 75, so that the attaching frame 73 and the electro-developing recording medium 30 are moved upward or downward due to the engagement of the engaging member 73 and the thread shaft 74. Namely, the recording medium moving mechanism 52 is constituted by the recording medium drive motor 76, the output shaft 77, the reduction gear 78, the drive gear 75, and the thread shaft 74.

Figure 7:
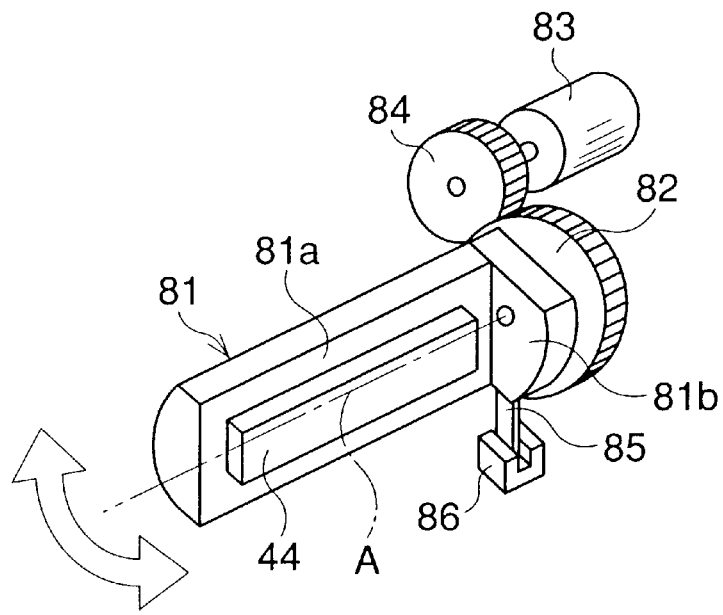
FIG. 7 is a perspective view showing a structure for rotating a line sensor about the longitudinal axis thereof.

FIG. 7 shows a construction for rotating the line sensor 44 around the longitudinal axis thereof. As shown in FIG. 7, the line sensor 44 is adhered on a plane surface 81a of the support member 81, which is rotatably supported around longitudinal axis A passing through the light receiving surface of the line sensor 44. Note that the support member 81 is provided in such a manner that the longitudinal axis A of the line sensor 44 is located at a position, which is optically equivalent to the light receiving surface of the electro-developing recording medium 30 and is a conjugation point of the scanner optical system 43.

A gear 82 is fixed on a rear surface of a flange 81b of the support member 81, and is meshed with a gear 84 provided on an output shaft of a sensor drive motor 83. The sensor drive motor 83 is a stepping motor, and is controlled by the system control circuit 20, so that the line sensor 44 is rotated about the longitudinal axis thereof.

An interruption plate 85 is provided on an outer peripheral surface of the flange 81b of the support plate 81, and a photo-interrupter 86 is disposed to face the outer peripheral surface of the flange 81b. The interruption plate 85 is positioned in a gap formed in the photo-interrupter 86 in accordance with the rotational position of the support member 81. When the light receiving surface of the line sensor 44 faces the mirror 51, i.e., when the line sensor 44 is set at a first angular position to direct the light source 42 to perform a reading operation, the photo-interrupter 86 is set in such a manner that the interruption plate 85 is positioned in a gap of the photo-interrupter 86. When the interruption plate 85 is set at this position, a signal indicating that the line sensor 44 is directed to the light source 42 is outputted from the photo-interrupter 86, and inputted into the system control circuit 20. When the motor 83 is rotated by a predetermined amount from a state in which the interruption plate 85 is set at the position, the line sensor 44 is rotated by 90 degrees and is set at a second angular position to face the mirror 54. As a result, the line sensor 44 is positioned at a position which is optically equivalent to the light surface of the electro-developing recording medium 30, so that a focusing operation can be carried out.

As shown in FIGS. 3 and 4, in the photographing operation, the electro-developing recording medium 30 is set at an upper end position. The quick return mirror 21 is set at the down position, and the line sensor 44 is fixed at a position so that the light receiving surface of the line sensor 44 faces the mirror 54. This fixed position of the line sensor 44 is set by counting pulse signals outputted by the sensor drive motor 83, on the basis of a state in which the interruption plate 85 is in the photo-interruptor 86. When the line sensor 44 faces the mirror 54, light passing through the photographing optical system 12 is reflected by the sub-mirror 21a and condensed by the AF optical systems 53a and 53b, and is led onto the light receiving surface of the line sensor 44 by the mirror 54. Thus, a part of the object image is formed on the line sensor 44, and an auto-focusing operation is carried out as described above.

Figure 8:
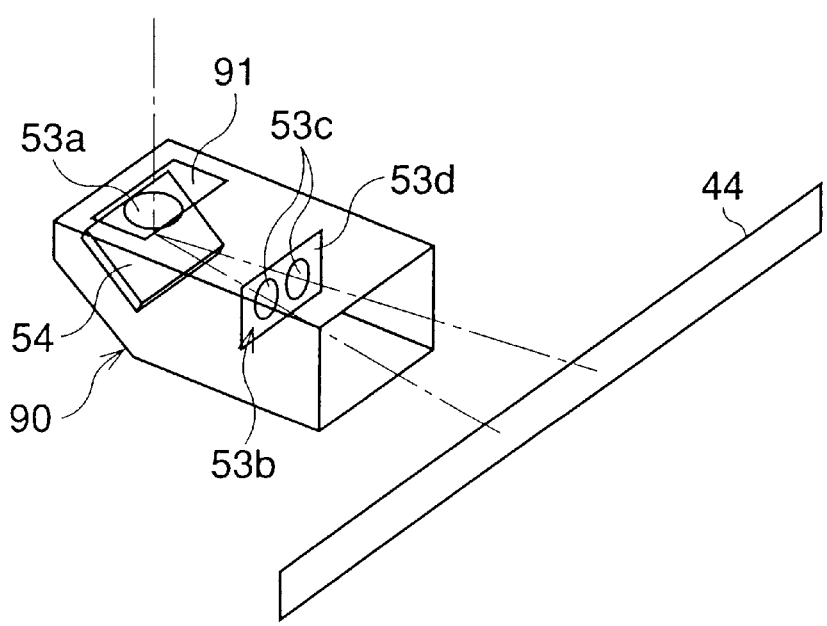
FIG. 8 is a perspective view showing a structure of a focusing sensing unit.

FIG. 8 shows a structure of a focusing sensing unit 90. The focusing sensing unit 90 has an infra-red cut filter 91, the mirror 54, the condenser lens 53a, and the separator lens unit 53b. The separator lens unit 53b has two separator lenses 53c, which are arranged in parallel to the longitudinal direction of the line sensor 44 and adjacent to each other, and an aperture mask 53d supporting the lenses 53c.

A luminous flux reflected by the sub-mirror 21a is focused on an equivalent plane, which is located right before entering the focusing sensing unit 90 and at a position optically equivalent to the light receiving surface of the electro-developing recording medium 30, and then, enters the infra-red cut filter 91, the condenser lens 53a, the mirror 54, and the separator lens unit 53b, so that two images are formed on two spots on the line sensor 44 by the separator lens unit 53b. Namely, the luminous fluxes, which have passed through areas which are separated into two parts by a vertical plane containing the optical axis of the photographing optical system 12, are focused on the two spots on the line sensor 44 by the separator lens unit 53b. Thus, object images used for sensing the focusing point is formed on the line sensor 44.

Note that, in sensing the focusing point, the line sensor 44 is positioned by a positioning mechanism including the sensor drive motor 83, the interruption plate 85, and the photo-interruptor 86, in such a manner that the equivalent plane and the light receiving surface of the line sensor 44 are positioned at conjugation points of the optical system provided in the focusing sensing unit 90, respectively.

Since the line sensor 44 is rotated, it is necessary that the distance between the separator lens 53b and the line sensor 44 is set to have some value. Accordingly, in comparison with a focus sensing unit used for a conventional auto focus camera, the focal length of the separator lens unit 90 is longer and the magnification of the image is slightly larger.

When carrying out an auto-focusing operation, in the system control circuit 20, the correlation between the two object images formed on the line sensor 44 is obtained based on the image signals read from the line sensor 44. Thus, the different amount (i.e., a defocus amount) between a focal point of the photographing optical system 12 and the equivalent plane which corresponds to the light receiving surface of the electro-developing recording medium 30, and the direction of the difference (i.e., a defocus direction) are calculated. In the lens drive circuit 19, the amount and the direction of the displacement of a focusing lens provided in the photographing optical system 12 are obtained based on the defocus amount and the defocus direction. Thus, the focusing lens is driven so that a focusing operation is performed.

As shown in FIGS. 5 and 6, when the reading operation is started, the electro-developing recording medium 30 is set at a lower end position, and the quick return mirror 21 is in the down condition. The line sensor 44 is fixed at a position in such a manner that the light receiving surface thereof faces the mirror 51, i.e., is directed to the light source 42 so that an image recorded on the electro-developing recording medium 30 is formed on the light receiving surface by the scanner optical system 43. The interruption plate 85 is located in the photo-interruptor 86. The illumination light outputted by the light source 42 passes through the collimating lens 55 and the electro-developing recording medium 30, and is led to the line sensor 44. Therefore, while the electro-developing recording medium 30 is gradually moved upward, the image recorded on the electro-developing recording medium 30 is read by the line sensor 44.

Note that, in the reading operation, the line sensor 44 is positioned by a positioning mechanism including the sensor drive motor 83, the interruption plate 85, and the photo-interruptor 86, a surface on which the image is formed on the electro-developing recording medium 30 and the light receiving surface of the line sensor 44 are positioned at conjugation points of the scanner optical system 43.

Figure 9:
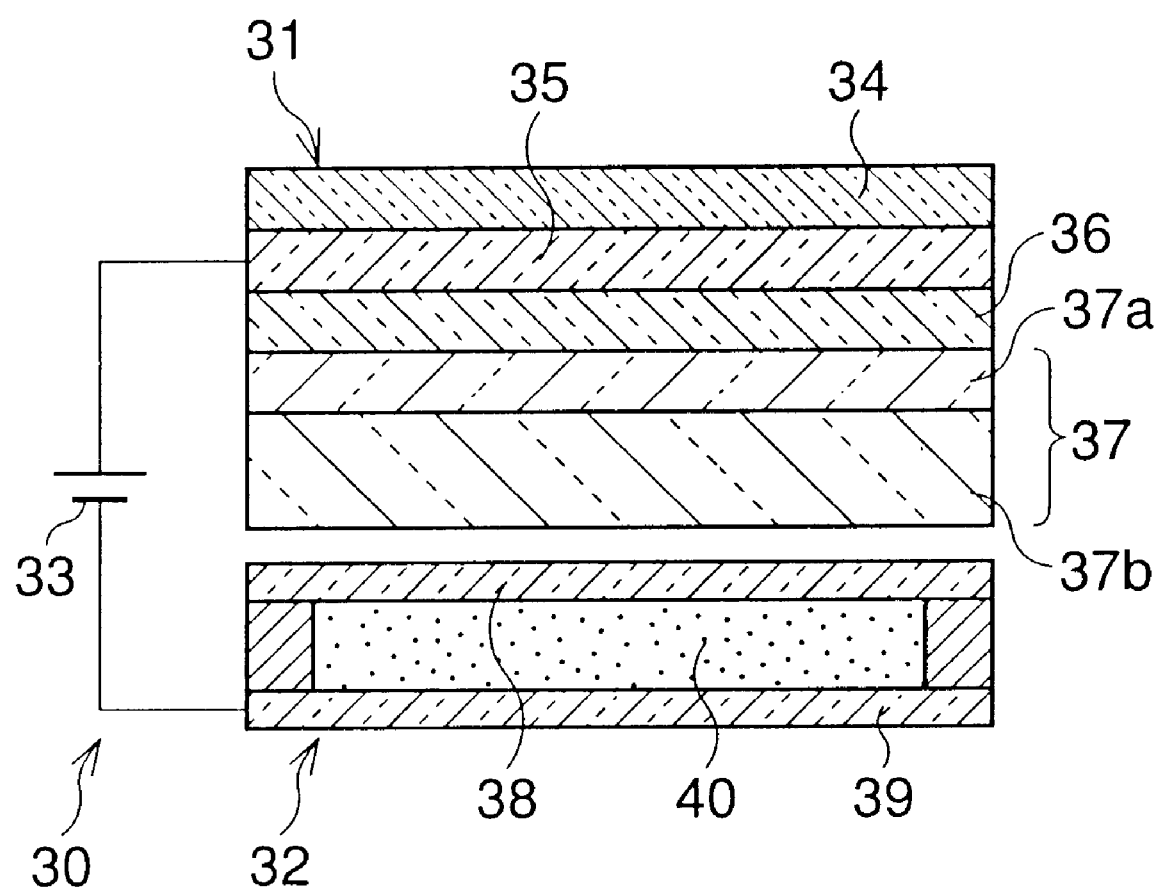
FIG. 9 is a sectional view showing a structure of the electro-developing recording medium.

FIG. 9 shows a structure of the electro-developing recording medium 30, which is obtained by modifying an electro-developing recording medium shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining a liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an image of an object is developed. Namely, the visible image is generated in accordance with the electric charge.

The electric charge storage medium 32 is a liquid crystal display having a memory-type liquid crystal such as a smectic liquid crystal, and thus, the developed visible image is kept therein even if the electric field is removed. In the liquid crystal display, the developed visible image can be erased by heating the liquid crystal display, using a heating device (not shown) at a predetermined temperature. In this case, the same electric charge storage medium 32 can be used repeatedly.

Figure 10:
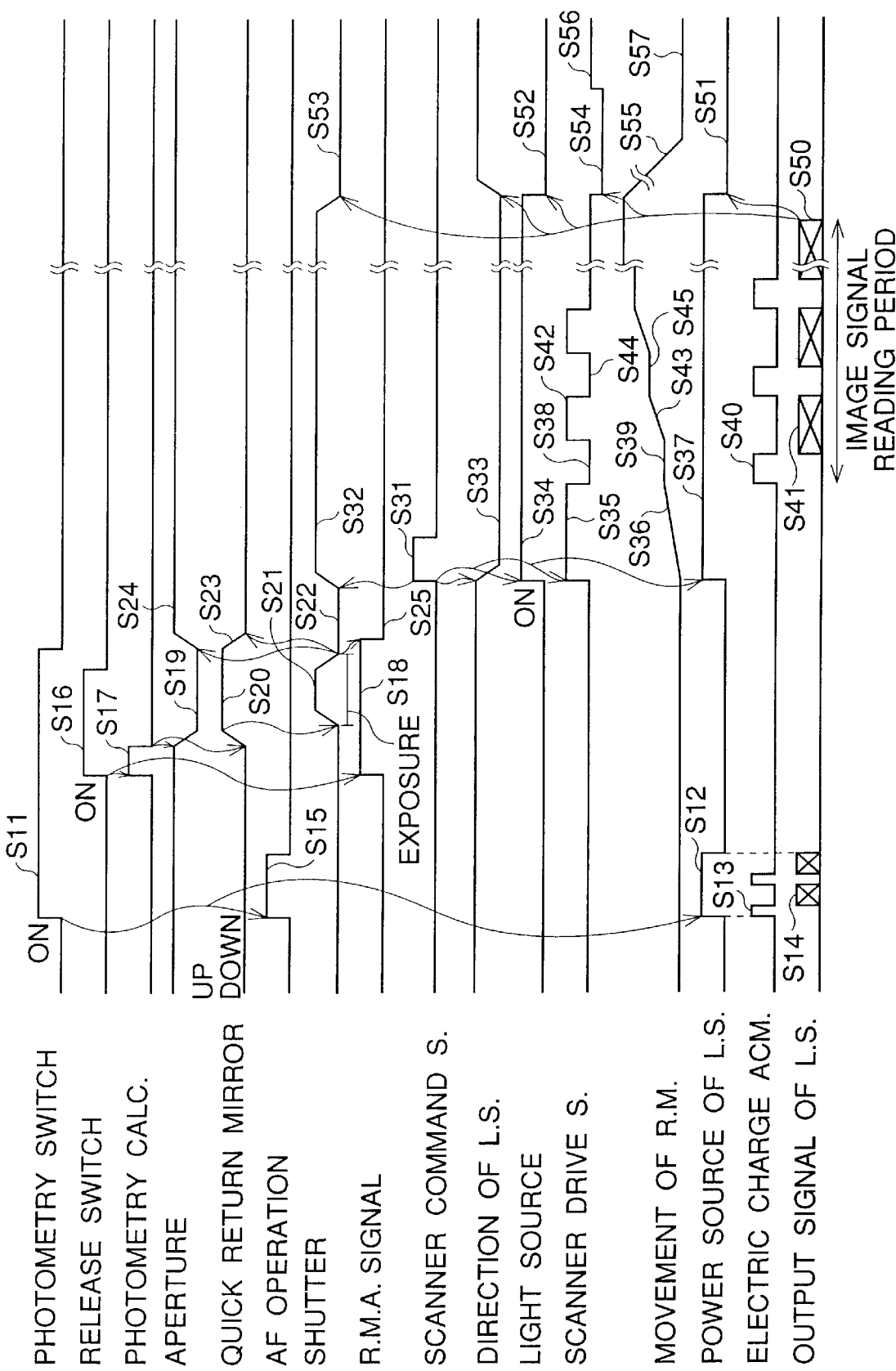
FIG. 10 is a timing chart showing a photographing operation and a reading operation.

FIG. 10 is a timing chart showing a recording operation in which an image is recorded in the electro-developing recording medium 30, and a reading operation in which the image recorded in the electro-developing recording medium 30 is read by the line sensor 44.

In the initial condition, the electro-developing recording medium 30 is set at the upper end position and on the optical axis of the photographing optical system 12, and the quick return mirror 21 is in the down position. The light receiving surface of the line sensor 44 faces the mirror 54, and is directed to the photographing optical system 12.

When the release button 14 is partly depressed to turn ON a photometry switch (reference S11), a line sensor drive power source included in the line sensor drive circuit 47 is turned ON (reference S12), so that an accumulation of electric charges in the line sensor 44 is started (reference S13). When a predetermined time has passed, a signal corresponding to the accumulated electric charges is outputted from the line sensor 44 (reference S14). The position of the lens of the photographing optical system 12 is adjusted in accordance with the output signal, so that an AF operation is carried out (reference S15).

When the release button 14 is fully depressed so that a release switch is turned ON (reference S16), an output signal of the photometry sensor 28, i.e., a photometry value, is sensed, and an exposure calculation is started based on the photometry value (reference S17). Then, a recording medium activating signal is outputted (reference S18), so that an electric voltage is applied to the electro-developing recording medium 30. When it is confirmed that the exposure calculation has been completed, the degree of opening of the aperture 12a is changed from the fully open state to a predetermined degree of opening (reference S19), the quick return mirror 21 is changed from the down position to the up position (reference S20), and the shutter 22 is open (reference S21).

When the exposure time obtained based on the exposure calculation has passed and it is confirmed that the exposure has been completed, the shutter 22 is closed (reference S22). With the completion of the closing operation of the shutter 22, the quick return mirror 21 is changed to the down position (reference S23) and the aperture 12a is fully opened (reference S24). The output of the recording medium activating signal is stopped (reference S25).

Thus, the recording medium activating signal is continuously outputted at least while the shutter 22 is open, and for this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

Then, when the scanning switch 16 is depressed, the scanning operation of the recording medium moving mechanism 52 is started, so that the reading operation is executed.

When a scanner command signal is outputted (reference S31) by depressing the scanning switch 16, the shutter 22 is opened (reference S32), and the line sensor 44 is rotated and directed to the light source 42 (reference S33). Further, the light source 42 is lit (reference S34), so that the electro-developing recording medium 30 is illuminated. Then, a scanner drive signal is outputted (reference S35), so that the recording medium drive motor 76 is rotated in a forward direction, and thus, the electro-developing recording medium 30 is started to descend (reference S36). At the same time, the line sensor drive power source included in the line sensor drive circuit 47 is turned ON (reference S37).

When it is confirmed that the line sensor 44 is set at a reading position (i.e., the first horizontal scanning line of the image to be scanned), the output of the scanner drive signal is stopped (reference S38), and thus the recording medium drive motor 76 is stopped (reference S39). This stopping operation is controlled by counting pulse signals, for example, used for rotating the recording medium drive motor 76.

Then, an exposure of the line sensor 44 is started, so that an accumulation of an electric charge by the line sensor 44 is performed (reference S40). When it is confirmed, by sensing that a constant time has passed, for example, that the exposure of the line sensor 44 has been completed, a reading operation of the line sensor 44 is started, and pixel signals of one horizontal scanning line are outputted from the line sensor 44 (reference S41). Then, the scanner drive signal for rotating the recording medium drive motor 76 in a forward direction is outputted (reference S42), so that the electro-developing recording medium 30 is moved downward (reference S43).

During this movement of the electro-developing recording medium 30, when it is confirmed that the line sensor 44 has been set at the position of the next horizontal scanning line, the output of the scanner drive signal is stopped (reference S44), and thus, the recording medium drive motor 76 is stopped (reference S45). Then, pixel signals of the next horizontal scanning line are outputted, in the same way as describe above.

When all of the horizontal scanning lines have been read (reference S50), the drive power source of the line sensor 44 is turned OFF (reference S51), and the light source 42 is turned OFF (reference S52). At the same time, the shutter 22 is closed (reference S53), and a scanner drive signal for rotating the recording medium drive motor 76 in the rearward direction is outputted (reference S54), and thus the electro-developing recording medium 30 starts to move upward (reference S55). The line sensor 44 is rotated so that the light receiving surface thereof is directed to the mirror 54, i.e., to the photographing optical system 12.

During the ascent of the electro-developing recording medium 30, when it is confirmed that the electro-developing recording medium 30 has returned to the initial position, the output of the scanner drive signal is stopped (reference S56), so that the recording medium drive motor 76 is stopped (reference S57). Note that the sensing operation of the initial position of the electro-developing recording medium 30 is performed based on a signal which is outputted when a part of the carriage 71 transverses a photo-interrupter (not shown).

As described above, the embodiment is constructed in such a manner that the auto-focusing adjustment of the photographing optical system 12 is performed using the line sensor 44 which is provided for reading an image signal recorded on the electro-developing recording medium 30. Accordingly, an exclusive optical sensor does not need to be provided for the auto-focusing adjustment, and thus, the structure of the electro-developing type camera becomes simple and compact.

Note that the line sensor 44 is not restricted to a construction in which one horizontal scanning line of image signal is read, but may sense three horizontal scanning lines of image signal.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI (filed on Mar. 15, 1996) and No. HEI (filed on Oct. 17, 1996) which are expressly incorporated herein, by reference, in their entirety.

We claim:

1. An image sensing device provided in an electro-developing type camera, in which an image obtained by a photographing optical system is formed on an electro-developing recording medium, by which said image is electronically developed, said device comprising:

an optical sensor;

a sensing unit that senses a state of focus of said image formed by said photographing optical system, by utilizing said optical sensor; and a reading unit that reads said image developed by said electro-developing recording medium, by utilizing said optical sensor.

2. An image sensing device according to claim 1, further comprising a positioning mechanism that sets said optical sensor at a first position when said sensing unit senses said state of focus, and at a second position when said reading unit reads said image.

3. An image sensing device according to claim 1, wherein said optical sensor comprises a line sensor.

4. An image sensing device according to claim 3, further comprising a rotating mechanism rotating said line sensor about a longitudinal axis thereof.

5. An image sensing device according to claim 4, further comprising a positioning mechanism that sets said optical sensor at a first angular position when said sensing unit senses said focusing condition, and at a second angular position when said reading unit reads said image.

6. An image sensing device according to claim 4, wherein said reading unit comprises a reading optical system that reads said image developed by said electro-developed recording medium, said longitudinal axis being located at a position optically equivalent to a light receiving surface of said electro-developing recording medium, and at a conjugation point of said reading optical system.

7. The image sensing device provided in an electro-developing type camera according to claim 1, further comprising:
   a positioning mechanism that sets said optical sensor at different positions in accordance with operations of said optical sensor;
   said sensing unit comprising a focus sensing optical system through which said image formed through said photographing optical system is formed on a first plane on which said optical sensor is positioned; and
   said reading unit comprising a reading optical system through which said image developed by said electro-developed recording medium is formed on a second plane on which said optical sensor is positioned;
   said positioning mechanism setting said optical sensor, when said optical sensor senses said state of focus, in such a manner that each predicted focal plane, which is optically equivalent to a light receiving surface of said electro-developing recording medium and a light receiving surface of said optical sensor, is positioned at a conjugation point of said focus sensing optical system, and when said optical sensor reads said image, each of an imaging surface of said electro-developing recording medium and a light receiving surface of said optical sensor is positioned at a conjugation point of said reading optical system.

8. The sensing device of an electro-developing type camera according to claim 7, wherein said optical sensor comprises a line sensor.

9. The sensing device of an electro-developing type camera according to claim 8, further comprising a rotating that rotates said line sensor about a longitudinal axis thereof.

10. The sensing device of an electro-developing type camera according to claim 9, further comprising a positioning mechanism that sets said optical sensor at a first angular position when said optical sensor senses said focusing condition, and at a second angular position when said optical sensor reads said image.

11. The sensing device of an electro-developing type camera according to claim 1, further comprising a light source that illuminates said electro-developing recording medium to read said image, said light source being disposed at a position which is opposite to said photographing optical system of said electro-developing recording medium.

12. The sensing device of an electro-developing type camera according to claim 1, further comprising a mechanism that moves said electro-developing recording medium in a direction transverse to an optical axis of said photographing optical system.

13. The sensing device in an electro-developing type camera according to claim 1, said electro-developing recording medium comprising an electrostatic information recording medium and an electric charge storage medium.

14. The sensing device for an electro-developing type camera according to claim 13, said electric charge storage medium comprising a liquid crystal display having a memory-type liquid crystal.

15. An electro-developing type camera that uses an electro-developing recording medium, said camera comprising:
   a photographing optical system through which an image is formed on the electro-developing recording medium; and
   an optical sensor operable in a first mode in which said optical sensor senses with light entering said camera through said photographing optical system to determine a state of focus of an image formed through said photographing optical system, said optical sensor being operable in a second mode in which said sensor senses light passing through the electro-developing recording medium to read the image developed by said electro-developing recording medium.

16. The electro-developing type camera according to claim 15, further comprising a sensor positioning mechanism for positioning said optical sensor, when in said first mode, to a position facing light entering through said photographing optical system and, when in said second mode, to a position facing light passing through said electro-developing recording medium.

17. The electro-developing type camera according to claim 16, wherein said optical sensor comprises a line sensor.

18. The electro-developing type camera according to claim 15, further comprising a mechanism for rotating said optical sensor about a longitudinal axis of said optical sensor between said first mode position and said second mode position.

* * * * *